United States Patent [19]

Shimamune et al.

[11] Patent Number: 4,978,438

[45] Date of Patent: Dec. 18, 1990

[54] ELECTROLYTIC CELL

[75] Inventors: Takayuki Shimamune, Tokyo; Yoshinori Nishiki; Shuji Nakamatsu, both of Kanagawa, all of Japan

[73] Assignee: Permelec Electrode Ltd., Kanagawa, Japan

[21] Appl. No.: 352,427

[22] Filed: May 16, 1989

[30] Foreign Application Priority Data

May 16, 1988 [JP] Japan .................................. 63-118915

[51] Int. Cl.⁵ ........................ C25B 9/00; C25B 15/08; C25B 13/00
[52] U.S. Cl. .................................... 204/265; 204/266; 204/295
[58] Field of Search ............... 204/130, 151, 256, 258, 204/265, 266, 295, 296, 252-255, 263-264, 257

[56] References Cited

U.S. PATENT DOCUMENTS 4,334,968  6/1982  Sweeney .......................... 204/266 X
4,443,424  4/1984  Olson ............................... 204/130 X
4,599,157  7/1986  Suzuki et al. .................... 204/295 X
4,613,415  9/1986  Wreath et al. .................. 204/266 X Primary Examiner—Donald R. Valentine
Attorney, Agent, or Firm—Sughrue, Mion, Zinn, Macpeak & Seas

[57]  ABSTRACT

The present invention is directed toward an electrolytic cell for treating fluids with gases that are evolved by electrolysis comprising an anode compartment separated from a cathode compartment by a diaphragm, and a gas-permeable and liquid-impermeable window formed in the anode and the cathode compartment, or formed in the anode or the cathode compartment, wherein the window is formed such that a gas evolved in the anode or cathode compartment or gases evolved in these two compartments are allowed to pass through the window to make contact with a fluid to be treated, said fluid being located outside said electrolytic cell, thereby treating the fluid.

4 Claims, 1 Drawing Sheet

ELECTROLYTIC CELL

FIELD OF THE INVENTION

The present invention relates to an electrolytic cell used to treat fluids with gases that are evolved by electrolysis.

BACKGROUND OF THE INVENTION

Processes of sterilizing or disinfecting fluids using gases that are evolved by electrolysis (e.g., disinfection of municipal water with chlorine gas, decomposition of organic matter in water with ozone gas, or disinfection of water with ozone gas) are common in the art. More recently, commercial methods of purification have become feasible in which COD (chemical oxygen demand) components can be removed from enriched aqueous solutions using only oxygen or ozone without adding any other agent, as described in U.S. Pat. No. 4,416,747. This approach has several advantages and holds promise in practical applications: first, the components that have undergone reaction will not remain as gases in the treated solution, thus, there is no need to add a special reagent to the solution; secondly, the absence of a special reagent prevents dilution of the aqueous solution under treatment.

In the methods described above, gases to be injected are introduced from an electrolytic cell through a filter and piping into a treatment vessel. In practice, however, pressure loss occurs within the piping or filter. In order to compensate for the pressure loss, a pressurizing pump or other means which increases the complexity of the equipment is necessary. To eliminate this problem, a method has been adopted in which the gases are preliminarily dissolved in water or another media and the resulting solution is mixed with the fluid of interest to cause a reaction. This method is advantageous in that a uniform reaction occurs and the gases evolved by hydrolysis are almost completely utilized. On the other hand, the volume of the fluid to be treated increases. This in turn necessitates post-treatments including re-concentration of the treated fluid.

To prevent the increase in the fluid volume, a method has been proposed wherein the fluid to be treated is directly subjected to electrolysis and the gases evolved are used to treat the fluid. This method, however, is not applicable to all of the kinds of fluids which can treated. In addition, if the fluid is corrosive, it will corrode electrode materials and other parts of the electrolytic system. Thus, the resulting contamination of the fluid necessitates periodic maintenance work.

SUMMARY OF THE INVENTION

The present invention solves the two prior art problems, simultaneously. Namely, the present invention solves the problems of an increase in the volume of the fluid being treated and contamination thereof.

An object, therefore, of the present invention is to provide an electrolytic cell in which gases evolved by electrolysis are brought into direct contact with the fluid to be treated thereby allowing the fluid to be treated easily and efficiently.

This object of the present invention is attained by an electrolytic cell composed of an anode compartment separated from a cathode compartment by a diaphragm. The electrolytic cell has a gas-permeable and liquid-impermeable window formed in said anode and/or cathode compartment in such a way that the gas evolved in said anode or cathode compartment or the gases evolved in these two compartments are allowed to pass through said window to make contact with a fluid to be treated in the outside of said electrolytic cell, thereby treating said fluid.

DETAILED DESCRIPTION OF THE INVENTION

Figure 1:
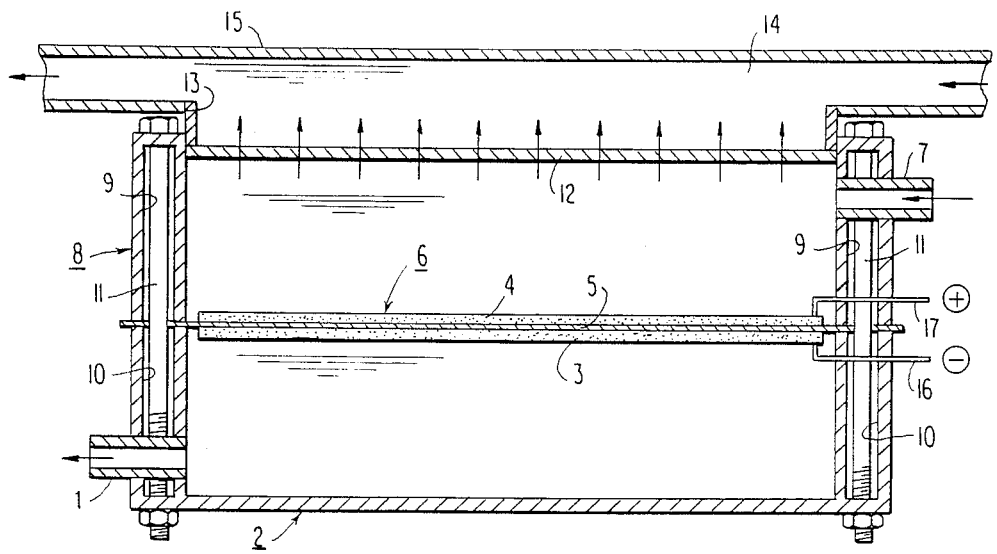
FIG. 1 is a longitudinal section of an electrolytic cell according to an embodiment of the present invention.

In the electrolytic cell of the present invention, the gas or gases evolved by electrolysis are allowed to pass through a gas-permeable and liquid-impermeable window to make contact with a fluid to be treated in the outside of the cell, thereby treating said effluent. This arrangement obviates the prior art need to use piping to achieve contact between the evolved gases and the fluid to be treated, thereby eliminating pressure loss that would otherwise occur if piping were used. In addition, the fluid will not mix with the electrolyte via the window. This in turn helps to prevent contamination of the electrolyte.

The electrolytic cell of the present invention is composed of an anode compartment and a cathode compartment which are separated by a diaphragm so that the gas evolved at the anode will not be reduced at the cathode whereas the gas evolved at the cathode will not be oxidized at the anode, thereby preventing a drop in operational efficiency. If chlorine gas is to be obtained in the electrolytic cell, an ion-exchange membrane is used as the diaphragm and an aqueous solution of sodium chloride is supplied to the anode compartment so that the chlorine gas will be evolved therein whereas sodium hydroxide is recovered from the cathode compartment. If a gaseous mixture of oxygen and ozone is to be obtained, a perfluorosulfonated ion-exchange membrane may be used as the diaphragm and pure water is supplied to the anode compartment. Further, a lead dioxide anode is pressed against the diaphragm, so that a gaseous mixture of oxygen and ozone is evolved in the anode compartment whereas hydrogen gas is evolved in the cathode compartment. In this second case, the perfluorosulfonated ion-exchange membrane serves not only as a solid polymer electrolyte (SPE) but also as a co-catalyst for ozone generation. Needless to say, the diaphragm and electrodes may be integrated in the form of an SPE electrode having an electrode material formed on one or both sides of a perfluorosulfonated ion-exchange membrane that is used as an SPE.

The window through which the gas or gases evolved by electrolysis make contact with the fluid to be treated must be gas-permeable and liquid-impermeable. The window may be made of any material that satisfies these requirements but a preferred example is a fibrous membrane of a fluorine resin known under the trade name "Gore-Tex" or a thin film of PTFE (polytetrafluoroethylene).

If these membranes are not sufficiently strong and need to be reinforced, they may be used in combination with porous filters made of resins, ceramics or corrosion-resistant metals such as PVC, glass, titanium, SUS (stainless steel). In the case of chlorine generation, a titanium filter may be coated with a fluorine resin to form a hydrophobic window. The titanium filter may itself be combined with a PTFE membrane or a fibrous membrane of fluorine resin. However, in this case, increased pressure loss might occur and thus the structural body is preferably made strongly. In the case of generating a gaseous mixture of oxygen and ozone, a titanium or titanium alloy filter whose surface is rendered hydrophobic by coating with a fluorine resin will also suffice. If desired, a nickel filter may be impregnated with a fluorine resin. If hydrogen gas is to be generated, a nickel screen or filter coated with a fluorine resin to form a hydrophobic window may be used.

The opening of the window is not limited to any particular value so long as it is not large enough to allow passage of liquid because the window should permit only the passage of gases evolved in the electrolytic cell, and the size of the opening is generally from 0.1 to 50 $\mu$m. The opening in the window is desirably as fine as possible in order to ensure that the evolved gases will form sufficiently tiny bubbles to attain satisfactory contact with the fluid to be treated. In order to ensure satisfactory contact between the evolved gases and the fluid being treated, a large contact area is necessary. To this end, the window is preferably as large as possible. The window, which performs its function effectively so long as the gases that are evolved in the anode and cathode compartments and which are necessary for the treatment of the fluid of interest make contact with said fluid, may be disposed in one or both compartments of the cell.

In practice, the treatment of a fluid may be performed in the electrolytic cell of the present invention in various ways. In one method, the cell is installed in such a way that it contacts the piping for the fluid, which is brought into contact with gases (i.e. those evolved in the cell) via the window made in the anode and/or cathode compartment. Alternatively, the cell is totally submerged within the fluid in such a way that the gases evolved in the cell will be released into the fluid to perform its treatment. If the first method is to be adopted, leakage of the effluent should be prevented by taking necessary precautions such cutting the piping to conform to the shape of the window in the cell for the effluent. If the second method is to be adopted, the electrolytic cell must be made of a corrosion-resistant material so that it is liquid-tight. Preferably, the electrolyte entrance and the effluent exit are flexible to facilitate handling. Unwanted gases may be discharged as such into the treated fluid but preferably waste gases are recovered from the system through a discharge pipe.

Two embodiments of the present invention are described hereinafter with reference to the accompanying drawings but it should be noted that the present invention is by no means limited to these embodiments.

FIG. 1 is a longitudinal section of an electrolytic cell according to an embodiment of the present invention. As shown, the electrolytic cell consists basically of a lower base 2, a SPE electrode 6 and an upper base 8. The lower base 2 has an effluent exit 1 near the bottom of its left-hand side and is open at the top. The SPE electrode 6 is made of an ion-exchange membrane 5 having a layer of cathode active material 3 on the lower surface and a layer of anode active material 4 on the upper surface and is placed within the opening of the lower base 2. The upper base 8 has an electrolyte entrance 7 near the top of its right-hand side above the SPE electrode 6 and is open at the bottom. The two bases 2 and 8 are secured by means of bolts 11 that pass through annular spaces 9 and 10 that are formed around the respective bases.

A gas-permeable and liquid-impermeable window 12 is formed on top of the upper base 8. Pipe 15 is placed above window 12 for the passage of a fluid to be treated 14 which has a cutout 13 that conforms to the shape of the window 12. The electrolyte in the anode compartment contacts the fluid 14 via the window 12. The electrolytic cell further includes a cathode current collector 16 for supplying power to the layer of cathode active material 3 and an anode current collector 17 for supplying power to the layer of anode active material 4.

The operation of the system shown above is discussed hereinafter. An electrolyte (e.g. aqueous sodium chloride) is supplied through the electrolyte entrance 7, with electric power on. Chloride ions are oxidized in the anode compartment to evolve chlorine gas. Because of its small specific gravity, the chlorine gas rises up to window 12, permeates it as indicated by arrows and contacts the fluid 14 in the pipe 15 above the window 12 to thereby sterilize, disinfect or otherwise treat the fluid 14. The treated fluid 14 flows through the pipe 15 and is recovered from the system at the left end as viewed in FIG. 1. In the cathode compartment of the cell, hydroxyl ions and the sodium ions that have permeated the ion-exchange membrane 5 react with each other to produce sodium hydroxide with the simultaneous evolution of hydrogen gas. These products are recovered from the system through effluent exit 1.

In order to treat fluids with the apparatus of the first embodiment described above, only a slightly modified pipe for the passage of the fluids need be employed in addition to the electrolytic cell for producing gases. Complex piping and associated devices such as a pressurizing pump, which have been necessary in the prior art, need not be used at all. As a further advantage, the window which is gas-permeable and liquid-impermeable prevents the fluid from getting into the electrolytic cell, thereby avoiding contamination of the electrolyte.

Figure 2:
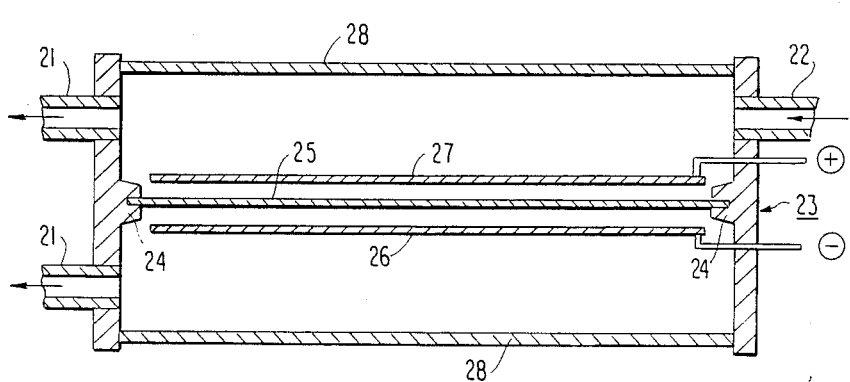
FIG. 2 is a longitudinal section of an electrolytic cell according to another embodiment of the present invention.

FIG. 2 is a longitudinal section of an electrolytic cell according to another embodiment of the present invention. As shown, the electrolytic cell consists basically of a tubular base 23, an ion-exchange membrane 25, a cathode 26 and an anode 27. The base 23 is made of a corrosion-resistant material and has an effluent exit 21 near the top and bottom of its left-hand side and an electrolyte entrance 22 near the top of its right-hand side. The ion-exchange membrane 25 is stretched taut between projections 24 on the inner surfaces of the central portion of the base 23. The cathode 26 is positioned below the ion-exchange membrane 25 with a slight gap formed there-between, and the anode 27 is positioned above the membrane with a slight gap being also formed therebetween. A window 28 is fitted in openings at the top and bottom ends of the cell base 23.

The apparatus of the second embodiment of the present invention described above is submerged in a fluid to be treated and the gases evolved in the anode and cathode compartments are released through the upper and lower windows 28 into the fluid so as to treat it. In this embodiment, complicated piping is also unnecessary and the ingress of the fluid being treated into the electrolytic cell is avoided. Thus, as in the first embodiment, the fluid can be treated without any complicated additional equipment or post-treatments.

The following examples are provided for the purpose of further illustrating the present invention but are in no way to be taken as limiting.

EXAMPLE 1

An electrolytic cell of the type shown in FIG. 1 was constructed in the following manner. One gram of a lead dioxide powder and 1 g of a suspension of fluorine resin were coated on one side of a perfluoro-sulfonated ion-exchange membrane (Nafion 110) and the coating was fixed by hearing at 150° C. under a pressure of 1 kg/m$^2$. A nickel coating of about 5 $\mu$m thick was formed on the other side of the ion-exchange membrane by conventional electroless plating. The resulting ion-exchange membrane was placed as a diaphragm in a cylinder of fluorine resin with its top open. A lead oxide coated titanium porous plate serving as a current collector was pressed onto the anode (lead dioxide)side of the ion-exchange membrane whereas a 50-$\mu$m porous nickel plate, thermally sprayed with a nickel powder, was pressed onto the cathode (nickel) side, thereby fabricating an electrolytic cell having a SPE electrode. As shown in FIG. 1, an electrolyte entrance was provided only on the side connecting to the anode compartment and an effluent exit also serving as a hydrogen gas discharge port was provided only on the side connecting to the cathode compartment.

A three-dimensional titanium filter having a suspension of fluorine resin coated in a thickness of 0.5 mm on the surfaces was provided as a window in the opening of the cylinder in such a way that it would be substantially parallel to the ion-exchange membrane.

A pipe for supplying a crude aqueous solution of phosphoric acid containing about 1,300 ppm of COD was attached to the window. When electrolysis was conducted with pure water being supplied into the electrolytic cell, only oxygen gas containing about 14% ozone was sent through the window into the crude aqueous solution of phosphoric acid and the COD in that solution was reduced to about 10 ppm. On the other hand, no increase in the concentration of phosphoric acid in the electrolyte was observed as a result of permeation of the aqueous phosphoric acid solution through the window. Consequently, the concentration of phosphoric acid in the treated fluid was kept constant throughout the treatment.

EXAMPLE 2

An electrolytic cell of the type shown in FIG. 2 was constructed in the following manner. A perfluorosulfonated ion-exchange membrane (Nafion 312) was used as a diaphragm; a porous titanium plate coated with an electrode catalyst (coated amount: 10 g/m$^2$) that was composed of a composite Ru-Ir-Ti oxide was used as an anode; and a three-dimensional porous nickel plate was used as a cathode. The three elements were assembled in a tube of fluorine resin (i.d. 10 cm) with its top and bottom open, thereby fabricating an electrolytic cell. An electrolyte entrance and an effluent exit were provided on the side connected to the anode compartment whereas only an effluent exit was provided on the side connected to the cathode compartment.

A fluorine resin was coated in a thickness of 200 $\mu$m on a metallic filter that was prepared by sintering a titanium powder to prepare a window. The window was fitted in the opening above the anode compartment of the electrolytic cell. Another window was prepared by a coating a fluorine resin in a thickness of 200 $\mu$m on a metallic filter that was prepared by sintering a nickel powder. This window was fitted in the opening below the cathode compartment.

The electrolytic cell thus fabricated was filled with a 5% aqueous solution of sodium hydroxide in the cathode compartment and was then submerged in a stream of municipal water. When electrolysis was conducted in this cell with a saturated aqueous solution of sodium chloride being supplied into the anode compartment at a current density of 30 A/dm$^2$, chlorine was evolved through the window above the anode compartment and hydrogen was evolved through the window below the cathode compartment. Permeation of the electrolyte and municipal water through the windows was not observed at all.

In accordance with the present invention, a gas to be used in the treatment of a fluid is generated in an electrolytic cell having a gas-permeable and liquid-impermeable window and the treatment of the fluid is accomplished by bringing it into contact with the evolved gas via the window. This eliminates the need to provide piping which tends to cause pressure loss and which requires associated devices such as a pressurizing pump. In the prior art, the fluid being treated will often get into the electrolyte to potentially cause its contamination or dilute its concentration, but this problem is absent from the present invention. Therefore, compared to the prior art electrolytic cell for fluid treatment, the apparatus of the present invention has the following advantages: it is simple in construction; it prevents electrode deterioration due to contamination of the electrolyte; and there is no need to perform a post-treatment such as concentration of the electrolyte.

Another advantage of the electrolytic cell of the present invention is that it can be directly submerged in the fluid to be treated so that the procedures of its treatment can be further simplified.

While the invention has been described in detail and with reference to specific embodiments thereof, it will be apparent to one of ordinary skill in the art that various changes and modifications can be made therein without departing from the spirit and scope thereof.

What is claimed is:

1. An electrolytic cell comprising:
    an anode compartment separated from a cathode compartment by a diaphragm; and
    a gas-permeable and liquid-impermeable window formed in said anode and said cathode compartment, or formed in said anode or said cathode compartment,
    wherein said window is formed such that a gas evolved in said anode or cathode compartment or gases evolved in these two compartments are allowed to pass through said window to make contact with a fluid to be treated, said fluid being located outside said electrolytic cell and flowing through a pipe having a cut-out formed to ensure contact between said fluid and said window, to thereby treat said fluid.

2. An electrolytic cell as in claim 1, wherein said window comprises a porous metallic or ceramic material, and a layer of fluorine resin is coated on a surface of said metallic or ceramic material to render said window hydrophobic.

3. An electrolytic cell comprising:
    an anode compartment separated from a cathode compartment by a diaphragm; and a gas-permeable and liquid-impermeable window formed in said anode and said cathode compartment, or formed in said anode or said cathode compartment, wherein said window is formed such that a gas evolved in said anode or cathode compartment or gases evolved in these two compartments are allowed to pass through said window to make contact with a fluid to be treated, said fluid being located outside said electrolytic cell and being treated by totally submerging said electrolytic cell in said fluid such that the gas or gases evolved are released into said fluid through said window, to thereby treat said fluid.

4. An electrolytic cell as in claim 3, wherein said window comprises a porous metallic or ceramic material, and a layer of fluorine resin is coated on a surface of said metallic or ceramic material to render said window hydrophobic.

* * * * *